US012434866B2

(12) United States Patent
Sampsel et al.

(10) Patent No.: US 12,434,866 B2
(45) Date of Patent: Oct. 7, 2025

(54) CARE DELIVERY TELEHEALTH DRONE

(71) Applicant: University of Cincinnati, Cincinnati, OH (US)

(72) Inventors: Debi Sampsel, West Chester, OH (US); Manish Kumar, Cincinnati, OH (US); Seung-Yeon Lee, Cincinnati, OH (US); Victoria Wangia Anderson, Mason, OH (US)

(*) Notice: Subject to any disclaimer, the term of this patent is extended or adjusted under 35 U.S.C. 154(b) by 46 days.

(21) Appl. No.: 18/007,624

(22) PCT Filed: Jun. 2, 2021

(86) PCT No.: PCT/US2021/035489
§ 371 (c)(1),
(2) Date: Dec. 1, 2022

(87) PCT Pub. No.: WO2021/247734
PCT Pub. Date: Dec. 9, 2021

(65) Prior Publication Data
US 2023/0227183 A1    Jul. 20, 2023

Related U.S. Application Data

(60) Provisional application No. 63/033,596, filed on Jun. 2, 2020.

(51) Int. Cl.
*B64U 20/87* (2023.01)
*A61B 5/00* (2006.01)
(Continued)

(52) U.S. Cl.
CPC ............ *B64U 20/87* (2023.01); *A61B 5/0015* (2013.01); *A61B 5/0205* (2013.01); *B64U 10/14* (2023.01);
(Continued)

(58) Field of Classification Search
CPC ........................ B64U 2101/57; B64U 2101/55
See application file for complete search history.

(56) References Cited

U.S. PATENT DOCUMENTS 9,056,676 B1    6/2015    Wang
9,307,383 B1    4/2016    Patrick
(Continued)

FOREIGN PATENT DOCUMENTS

DE    102022204773 A1 *  11/2023    ........... G08B 25/016
KR    20180056326 A         5/2018
(Continued)

OTHER PUBLICATIONS

International Search Report mailed Sep. 1, 2021 and Written Opinion in Intl. Patent Application No. PCT/US2021/035489, filed Jun. 2, 2021. 10 pgs.
(Continued)

*Primary Examiner* — Christopher P Ellis
(74) *Attorney, Agent, or Firm* — Brent M. Peebles (57) ABSTRACT

A remote health care apparatus is disclosed that incorporates a drone device and a health kit. The drone device includes one or more communication devices, and the drone device is capable of two-way auditory and visual communication. The health kit is capable of being transported by the drone device and can be detached from the drone device. In one embodiment, the health kit contains one or more medical devices selected from the group consisting of biometric measuring devices, specimen collection devices and lab testing tools.

21 Claims, 5 Drawing Sheets

(51) Int. Cl.
*A61B 5/0205* (2006.01)
*B64U 10/14* (2023.01)
*B64U 80/25* (2023.01)
*B64U 101/55* (2023.01)
*B64U 101/60* (2023.01)
*B64U 10/70* (2023.01)
*B64U 101/20* (2023.01)
*B64U 101/30* (2023.01)

(52) U.S. Cl.
CPC .............. *B64U 80/25* (2023.01); *B64U 10/70* (2023.01); *B64U 2101/20* (2023.01); *B64U 2101/30* (2023.01); *B64U 2101/55* (2023.01); *B64U 2101/60* (2023.01); *B64U 2201/10* (2023.01); *B64U 2201/20* (2023.01)

(56) References Cited

U.S. PATENT DOCUMENTS

| | | |
|---|---|---|
| 10,479,528 B1 | 11/2019 | Liang et al. |
| 11,437,139 B2 | 9/2022 | Bradley et al. |
| 11,513,538 B1 * | 11/2022 | Kaneria ................. B64C 39/024 |
| 11,572,166 B2 | 2/2023 | Chen et al. |
| 11,794,895 B2 * | 10/2023 | Volkart ................. B64C 39/024 |
| 11,807,406 B1 * | 11/2023 | Wengreen .............. G06V 20/17 |
| 2011/0130636 A1 | 6/2011 | Daniel et al. |
| 2015/0002606 A1 * | 1/2015 | Hyde ....................... H04N 7/14 348/14.02 |
| 2017/0327223 A1 | 11/2017 | Sekine et al. |
| 2018/0039262 A1 * | 2/2018 | Fox ......................... H04W 4/02 |
| 2018/0039752 A1 * | 2/2018 | Subbarao ................ G16H 40/67 |
| 2018/0057167 A1 | 3/2018 | Mishra et al. |
| 2018/0105063 A1 * | 4/2018 | Wei ........................ B60L 50/66 |
| 2018/0233055 A1 * | 8/2018 | Damnjanovic ......... G01S 11/02 |
| 2018/0342329 A1 | 11/2018 | Rufo et al. |
| 2019/0043615 A1 | 2/2019 | Subbarao et al. |
| 2019/0077506 A1 | 3/2019 | Shaw et al. |
| 2019/0096262 A1 * | 3/2019 | Dotzler ................. G07C 5/0816 |
| 2019/0130770 A1 | 5/2019 | Di Benedetto et al. |
| 2020/0346751 A1 * | 11/2020 | Horelik .................. G05D 1/101 |
| 2022/0066478 A1 * | 3/2022 | Kunwar ................ G05D 1/1062 |
| 2022/0118267 A1 * | 4/2022 | Giacometti .......... A61N 1/3993 |
| 2022/0253076 A1 * | 8/2022 | Cleland-Huang ...... G05D 1/104 |
| 2023/0290498 A1 * | 9/2023 | Holloway Owens ........................ G08G 5/0013 |

FOREIGN PATENT DOCUMENTS

| | | | | |
|---|---|---|---|---|
| KR | 20230126644 A | * | 6/2020 | |
| WO | WO-2018022021 A1 | * | 2/2018 | ............. B64C 27/08 |
| WO | WO-2018185524 A1 | * | 10/2018 | |
| WO | WO-2019173861 A1 | * | 9/2019 | ........... A01K 11/006 |
| WO | WO-2023198488 A1 | * | 10/2023 | ............ B25J 11/009 |
| WO | WO-2023220209 A1 | * | 11/2023 | |

OTHER PUBLICATIONS

Jeremy Tucker, "A Role for Drones in Healthcare", Drones in Healthcare, Dec. 10, 2013.
Eric Wicklund, "Drones Show Potential for Delivering Telemedicine, mHealth Services", mHealth Intelligence, Dec. 27, 2017.
Vidyo Press Release, Bob Griffin, "Stampede and Vidyo Introduce Drone Based Video Conferencing Solution at InfoComm 2015".
Mark Haranas, "Are Drones The Future of Video Conferencing? Google Thinks So", Aug. 29, 2016, TheChannelCO.CRN.
Kunj Bhatt, BA, Ali Pourmand, MD, MPH, and Neal Sikka, MD, "Targeted Applications of Unmanned Aerial Vehicles (Drones) in Telemedicine", Department of Emergency Medicine, The George Washington University School of Medicine and Health Sciences, Washington, District of Columbia. Mary Ann Liebert, Inc. vol. 24 No. 11. Nov. 2018, Telemedicine and e-Health p. 833.

* cited by examiner

CARE DELIVERY TELEHEALTH DRONE

CROSS REFERENCE TO RELATED APPLICATIONS

This application is a continuation of PCT Application No. PCT/US21/35489 filed Jun. 2, 2021, which claims benefit of U.S. Provisional Application Ser. No. 63/033,596, filed Jun. 2, 2020, which application is hereby incorporated by reference in its entirety.

TECHNICAL FIELD

The present invention relates generally to drones for providing health services. Specifically, the present invention is related to methods of providing telehealth services.

BACKGROUND OF THE INVENTION

The healthcare needs of our population continue to expand and new alternatives are needed to meet this need. One area in need of improvement is remote healthcare delivery. Many consumers and patients are in remote areas or have little access to transportation or appropriate medical facilities. In addition, some consumers and patients may prefer to receive care remotely at a location of their choosing. For example, many customers may prefer remote visits during a public health emergency. Such patients may not receive the medical care needed or may only receive a certain level of care depending on available facilities.

Current options for providing healthcare that is remote from a healthcare facility include vehicles and certain mail-in tests. Mobile healthcare vehicles are expensive and have limited capacities. In addition, healthcare vehicles require travel time for physicians and/or clinicians. This is not an efficient use of their limited time since such travel is time when these individuals are not seeing patients. In addition, the health care provider workforce continues to have shortages and the shortage is expected to continue to grow. Mail-based services have also been used. For example, the patient may take a noninvasive sample, such as saliva, and may mail the sample to a lab for analysis. Problems with this method include an inability to do a broad assessment, as the samples available from a patient tend to be limited, the time from collection to testing may be limited rendering the sample unusable, and specimens can get contaminated or lose attributes over time, and thus can be highly limited.

Therefore, there is an ongoing need for providing health care remotely that allows for direct patient-health care provider communication while being an efficient use of health care provider time. There is also a need for a remote device that allows health care providers to assess patients and collect samples for evaluation.

SUMMARY OF THE INVENTION

The present invention addresses this need with a remote health care apparatus that incorporates a drone device and a health kit. The drone device includes one or more communication devices, and the drone device is capable of two-way auditory and visual communication. The health kit is capable of being transported by the drone device and can be detached from the drone device. In one embodiment, the health kit contains one or more medical devices selected from the group consisting of biometric measuring devices, specimen collection devices and lab testing tools.

In another embodiment, the drone device comprises a zooming camera system with high power resolution. In one embodiment, the drone device comprises an infrared vision camera. In another embodiment, the drone device comprises ancillary lights for augmenting various locations.

In one embodiment, the drone device is capable of interfacing with blue tooth systems. In another embodiment, the drone device is capable of interfacing with cloud computing systems.

In one embodiment, the drone device comprises a processor that is capable of artificial intelligent interpretations. In another embodiment, the drone device comprises a collision avoidance system and an obstacle detection system. In one embodiment, the drone device comprises a navigation system. In another embodiment, the drone device comprises a cyber security encryption system. In one embodiment, the drone device comprises anti-theft features. In another embodiment, the drone device comprises a tracking system. In one embodiment, the drone device has self-destruction capability.

In another embodiment, at least one biometric measuring device is selected from the group consisting of a pulse oximeter, a thermometer, a blood pressure reader, a pulse reader, a heart rhythm detector, a stethoscope and a tape measure. In one embodiment, the health kit is lockable. In another embodiment, the health kit is waterproof.

In one embodiment, the present invention involves a method of providing health care to a subject that is at a remote location from a health care provider. The method involves the steps of:
 a. sending the previously described remote health care apparatus to the remote location;
 b. establishing communication between the subject and the health care provider via the one or more communication devices;
 c. detaching the health kit from the drone device;
 d. having the subject interact with at least one medical device from the health kit;
 e. reattaching the health kit to the drone device; and
 f. sending the remote health care apparatus to another location.

In another embodiment, the method further includes the step of placing the remote health care apparatus in a docking station after it returns from the remote location. In one embodiment, the docking station recharges the remote health care apparatus. In another embodiment, the method further includes the step of sanitizing the remote health care apparatus after it returns from the remote location. In one embodiment, the method further includes the step of replacing the health kit with another health kit after the remote health care apparatus returns from the remote location.

DETAILED DESCRIPTION

The details of one or more embodiments of the disclosed subject matter are set forth in this document. Modifications to embodiments described in this document, and other embodiments, will be evident to those of ordinary skill in the art after a study of the information provided herein.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

While the following terms are believed to be well understood by one of ordinary skill in the art, definitions are set forth to facilitate explanation of the disclosed subject matter. Unless defined otherwise, all technical and scientific terms used herein have the same meaning as commonly understood by one of ordinary skill in the art to which the disclosed subject matter belongs.

Certain terminology is used in the following description for convenience only and is not limiting. As used herein, "drone" means an unmanned flying device capable of carrying one or more containers and delivering said container to a given place. The size, mass, dimensions, payload and functionality of such drones are chosen according to the desired operational capabilities.

As used herein, "health care provider" means an individual or entity duly licensed or legally authorized to provide health care services.

As used herein, "cloud computing" means data processing when the required computing capacities are provided as an Internet service.

As used herein, the terms "patient," "care-recipient" and "subject" are used interchangeably to refer to an individual receiving health care services.

Similar reference numerals will be utilized throughout the application to describe similar or the same components of each of the preferred embodiments of the implant described herein and the descriptions will focus on the specific features of the individual embodiments that distinguish the particular embodiment from the others It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

In one embodiment, the present invention is a remote healthcare delivery drone. The drone is semi-autonomous and designed to be controlled safely and remotely by the health care provider while establishing a link that allows audio and visual interactions between the care-recipient and the health care provider. A health kit delivered by the drone provides the mechanism that facilitates a physical assessment capability between the care-recipient and health care provider. Functionalities of the drone are designed to obey all current federal drone flight regulations (per Part 107 of FAA guidelines) with appropriate waivers, as needed. The drone operates in accordance with healthcare and other applicable accreditation rules, telehealth, home and healthcare policies, professional licensure scope of practice, and certification competencies.

Drone Device

Figure 1:
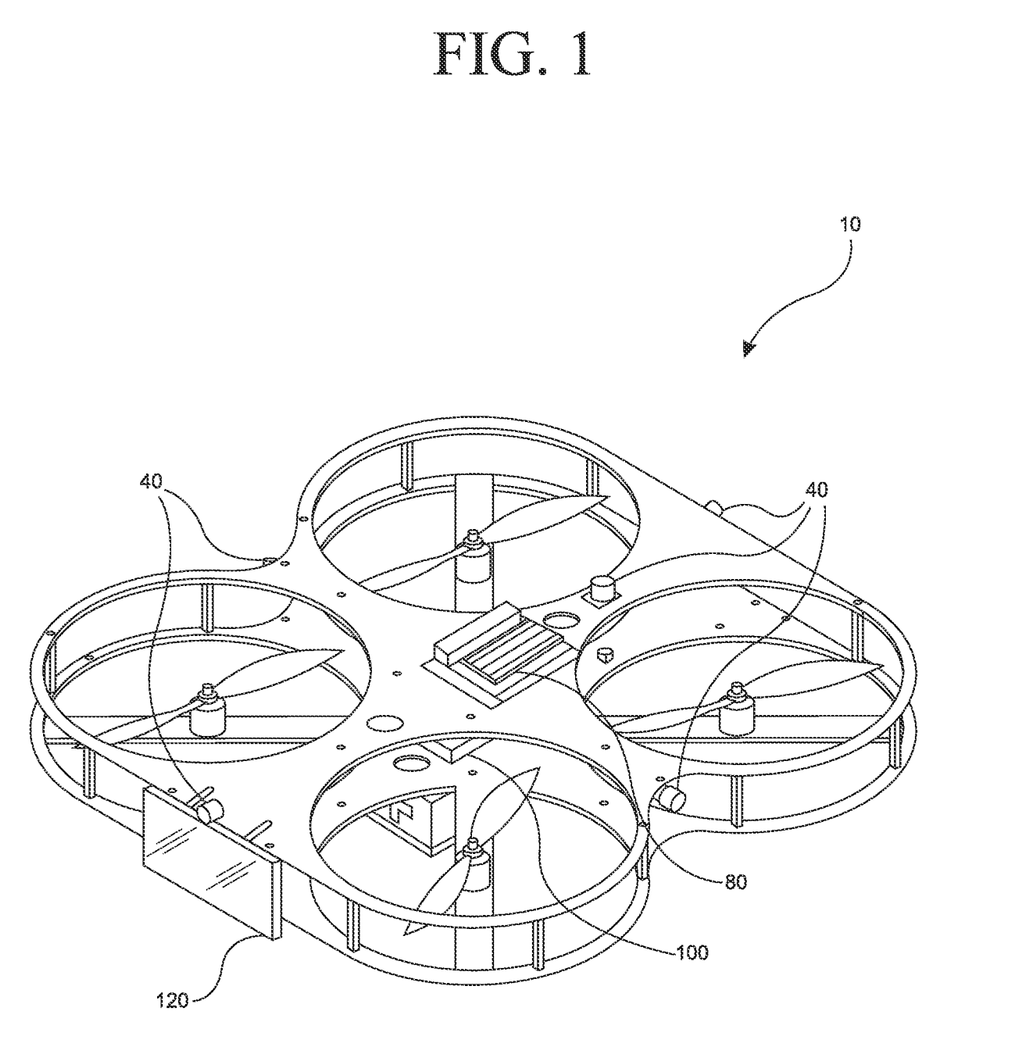
FIG. 1 is a schematic diagram of one embodiment of the drone of the present invention showing a top perspective view.
Figure 2:
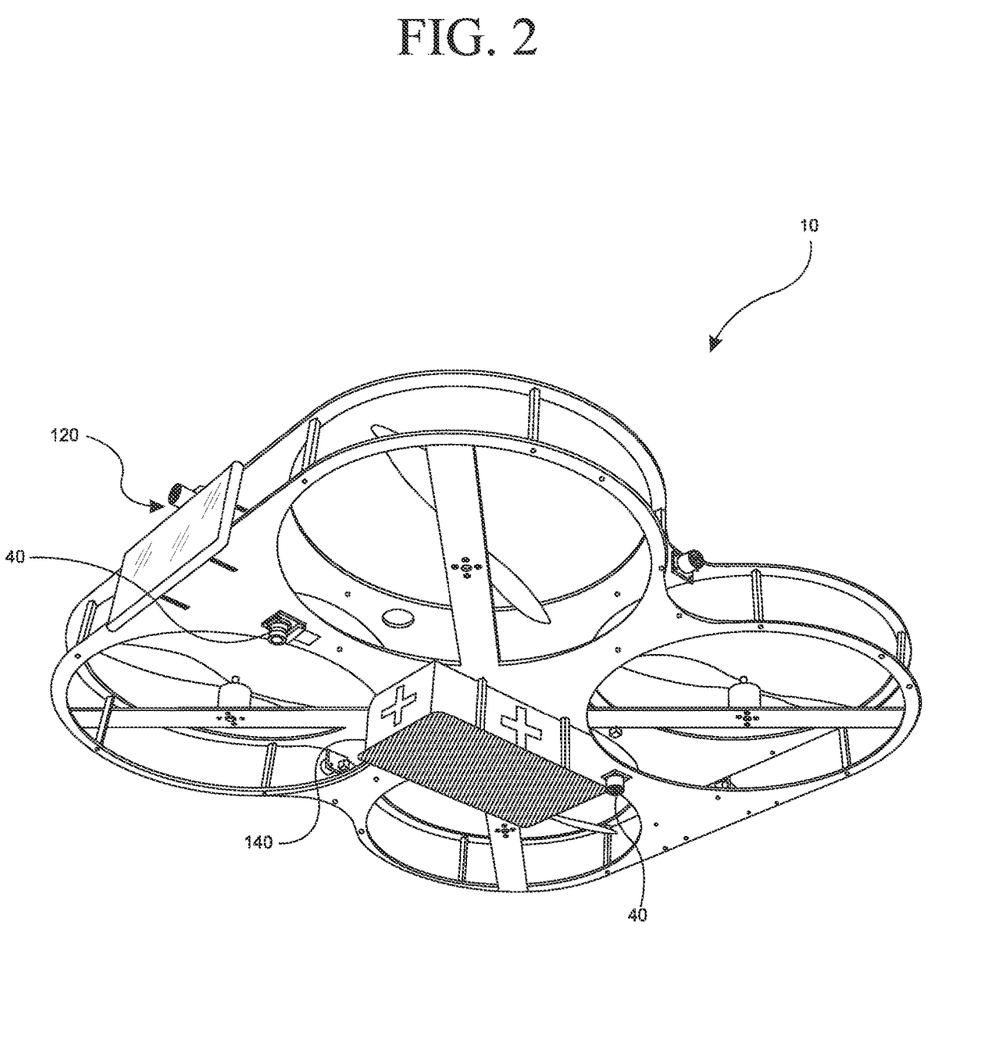
FIG. 2 is a schematic diagram of one embodiment of the drone of the present invention showing a bottom perspective view.

FIGS. 1 and 2 show schematic diagrams of the drone device 10. This embodiment of the drone device 10 has a number of components. An onboard computer 80 interacts with the flight computer/auto-pilot 100 and onboard sensors 40. It accepts navigational command from a user and sends that to the auto-pilot. It is used for data processing and providing navigational aid (such as obstacle avoidance, lost link intelligence, picking/placing objects) to the remote pilot. The drone 10 has ultrasonic or other proximity sensors 40 for obstacle avoidance. It may also incorporate ultrasonic or other proximity sensors and optical flow for positional feedback. In one embodiment, the drone is powered by a battery, a fuel cell, or both.

The drone 10 includes one or more communication devices and the drone 10 is capable of two-way auditory and visual communication. In one embodiment, the drone 10 has a screen with a camera and microphone 120 for communication between the patient and health care provider(s). This screen enables two-way visual and oral communications without the patient needing any devices. This will reduce the "digital divide" to advance health equity. It creates the capacity for one-on-one consultations, multiple consultations and group therapy sessions. As a non-limiting example, this system enables simultaneous multiple virtual health care consults including health care providers and non-providers in various circumstances (e.g., for emergency dept. accident scene, homeland security situations or homeless camps).

The drone 10 may also incorporate a flight autopilot system with inertial sensors and pressure sensor that acts as lower level flight controller that accepts inputs from onboard computer 80 and sends commands to drone motors. The drone 10 carries a health kit 140.

In another embodiment, the drone device comprises a zooming camera system with high power resolution. In one embodiment, the drone device comprises an infrared vision camera. In another embodiment, the drone device comprises ancillary lights for augmenting various locations.

In one embodiment, the drone device is capable of interfacing with blue tooth systems. In another embodiment, the drone device is capable of interfacing with cloud computing systems.

Figure 3:
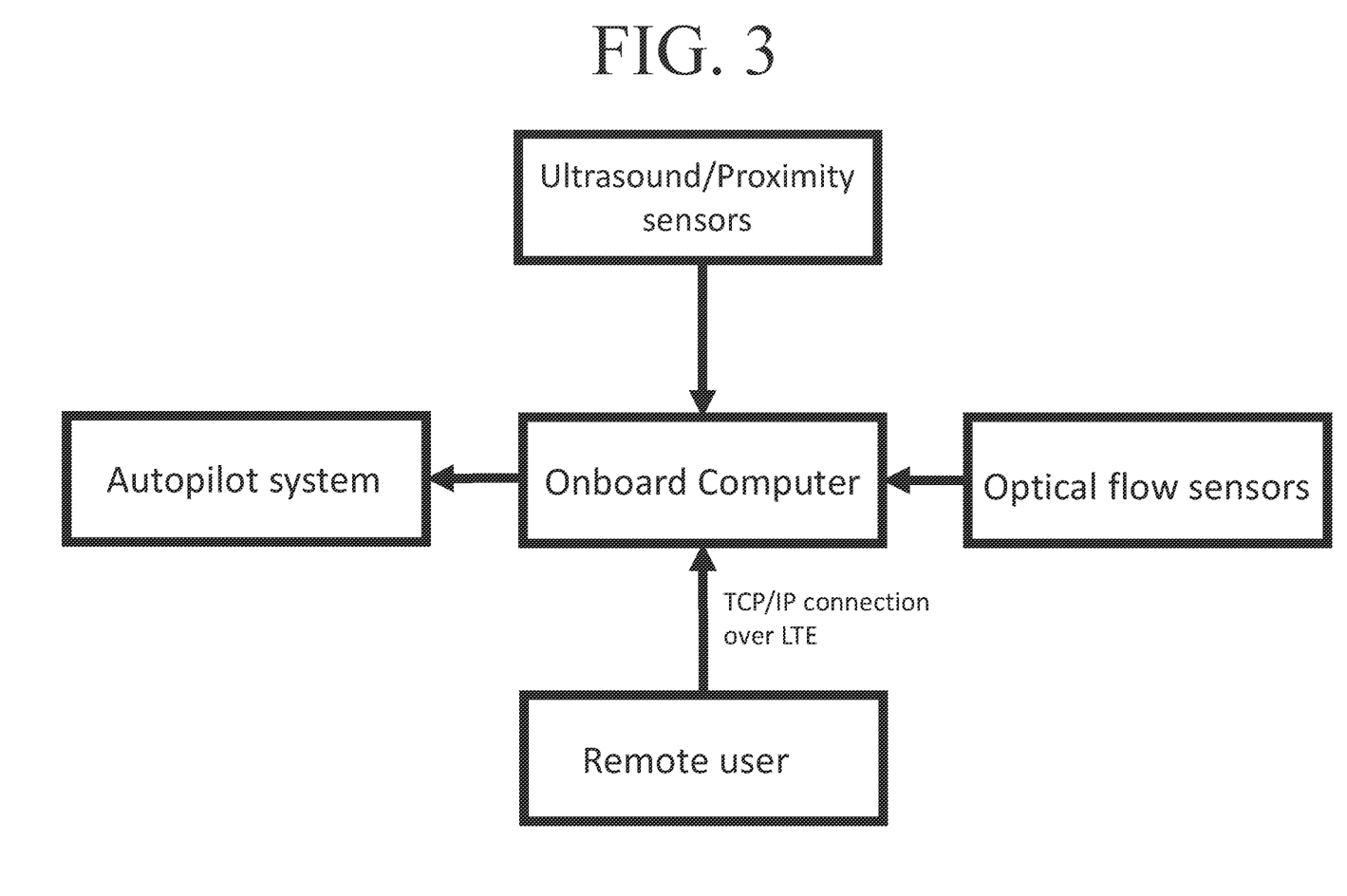
FIG. 3 is schematic diagram showing one embodiment of the architecture of the flight control module.

In one embodiment, the drone device comprises a processor that is capable of artificial intelligent interpretations. It is also capable of interfacing with various devices. In another embodiment, the drone device comprises a collision avoidance system and an obstacle detection system. In one embodiment, the drone device comprises a navigation system. Non-limiting examples include GPS and Celestial. In another embodiment, the drone device comprises a cyber security encryption system. In one embodiment, the drone device comprises anti-theft features. In another embodiment, the drone device comprises a tracking system. In one embodiment, the drone device has self-destruction capability The telehealth drone embodies a number of technological innovations. For example, a flight control module is used. FIG. 3 shows the architecture of the flight control module that consists of: i) onboard computer; ii) autopilot system; iii) ultrasound/proximity sensors on the four sides for obstacle avoidance; iv) at least one ultrasound/proximity sensor at the bottom of the drone for altitude control; and v) one or more optical flow sensors at the bottom of the drone for stable flight. The flight control system allows easy navigation and control of the drone by a remote user who will require no Remote Control (RC) piloting experience to control the drone. In one embodiment, the remote user interacts with the drone via a TCP/IP connection to the onboard computer enabled by cellular LTE network.

In one embodiment of the present invention, a smooth remote operation of the drone is achieved via a unique semi-autonomous ability of the drone that accepts broad navigational command from remote user such as motion along x, y, and z direction and yaw motion. The camera feed from the drone is used in First Person View fashion by the remote pilot to provide command. The remote pilot may use a computer keyboard to send the command. In another embodiment, a joystick may be used. The command obtained from the user is transformed on the onboard computer into appropriate attitude commands to obtain the desired motion. The attitude command is then transmitted to the autopilot system.

In another embodiment, the flight control is aided by an obstacle avoidance system that will take precedence over any navigational command by the pilot of the drone, thus making the drone completely collision-proof. The obstacle avoidance is achieved using the ultrasound/proximity sensors mounted on all sides of the drone. The sensors will keep monitoring distances, and the control module will not allow any motion if that motion brings the drone closer than a threshold value to an obstacle.

In one embodiment, the drone achieves a stable flight control using cameras (both downward and forward looking) that is used for calculating optical flow. Proximity sensors such as laser or ultrasound may also be used for positional estimation that is used in flight control. This capability can prevent any drift during hovering. This, along with downward-looking ultrasound/proximity, will hold the altitude and its position in a stable manner. This is achieved using control algorithms that will correct any changes in the drone's position that are detected by optical flow or ultrasound/proximity sensors.

In one embodiment, the drone has a GPS mapping for directional purposes as well as for the patient and remote pilot/health care provider to track the location and arrival time. In another embodiment, the drone includes a signal and locator mechanism for tracking if it is stolen.

In another embodiment, the drone has a flame-retardant coating and/or a heat shield to withstand fire or intense heat.

Additional Capabilities of the Drone

Robustness against time-delays: The command sent over the TCP/IP by remote user may suffer from time delays in communication. This delay would make it harder to control the drone accurately. A control algorithm makes drone remote operation smoother by using algorithms that estimate the time delays and accordingly control the speed of the robot. This prevents the user from over/under compensating their commands due to delay in communication.

Robustness against a lost link between the drone and the pilot: In one embodiment, the drone has inbuilt intelligence to handle the lost communication with the remote pilot/health care provider. First, it will wait for the communication to resume for a pre-specified amount time in a hovering configuration. If the communication is still not resumed, it will initiate the procedure to auto-land. The procedure will begin after the drone finds an appropriate landing spot using image processing carried out using the camera.

Health kit hand-off and pick-up: The drone has a mechanism to hand-off the health kit. In order to do this, the drone would land on an appropriate spot. Subsequently, it would release the kit by releasing a lock mechanism for retrieval by the patient. The patient can put the kit back by pushing the kit into a locked position. The drone is on ground with its propellers off while this operation happens.

In one embodiment, the telehealth drone resides in a storage sanitization-unit that serves as a repower station and/or sanitization station. In another embodiment, the drone includes a robotic extendable arm and hand capable of removing & opening the health kit.

In another embodiment, the drone has transformer conversion capabilities allowing for travel by air or land. For example, the flying drone could incorporate a tread system for moving on the terrain once it has landed. In one embodiment, the drone includes suction cup landing pads that are capable of sticking to various surfaces for stabilization and crush avoidance capability.

The drone may include an auditory announcement system to alert persons nearby to potential hazards or other instructions (e.g., stand back away from the blades, don't touch the drone). In one embodiment, the drone includes a retractable repair tool kit. In one embodiment, the drone includes a self-sterilization function. For example, ultraviolet light could be used to sterilize all or part of the drone and/or the health kit.

Health Kit

Figure 4A:
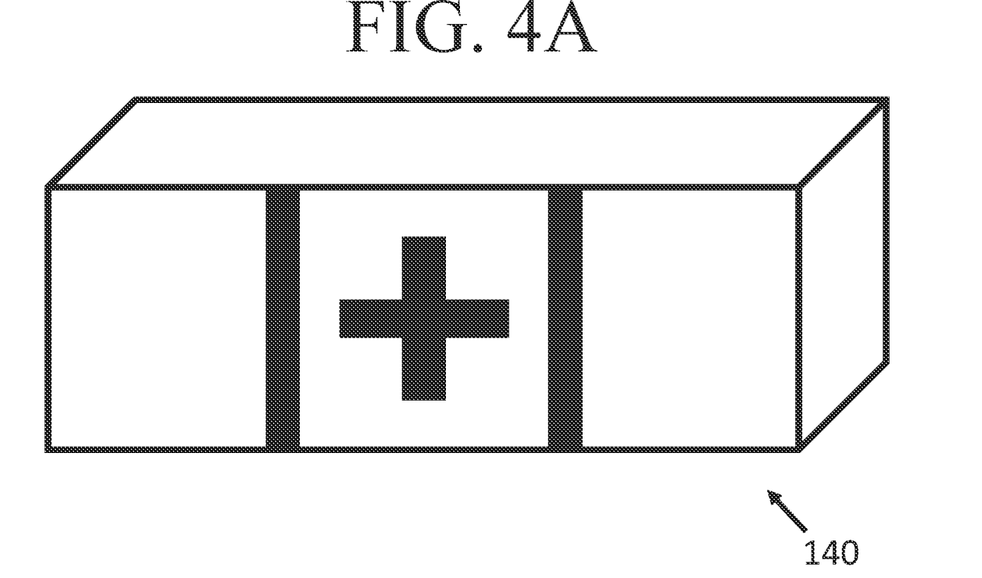
FIG. 4A is an illustration showing a perspective view of the health kit.
Figure 4B:
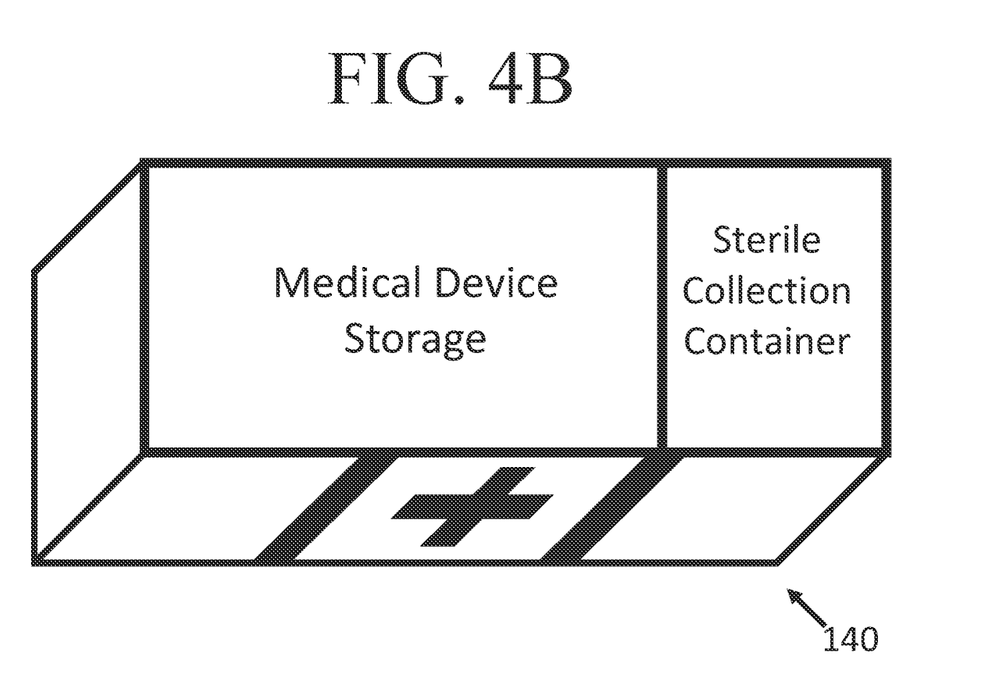
FIG. 4B is an illustration showing a top view of the health kit.

Referring to FIGS. 2, 4A and 4B, a drone health kit ("kit") 140 is attached to the drone 10 for delivery of various medical devices/supplies to the home. The kit 140 is a rigid, waterproof and dust proof container that can be attached to (and detached from) the drone 10. In one embodiment, the kit 140 includes a medical device storage compartment and a sterile collection container to store testing samples (such as nose swabs). In one embodiment, the kit 140 is fully stocked for a single stop due to the need for infection control and disinfecting properties.

The devices to be carried in the kit 140 by the drone 10 are dependent upon the drone's design and weight bearing capability. In one embodiment, the kit contains medical devices selected from the group consisting of biometric measuring devices, specimen collection devices and lab testing tools. Non-limiting examples of biometric measuring devices include a pulse oximeter, a thermometer, a sensor strip/dot thermometer, a blood pressure reader, a pulse reader, a heart rhythm detector, a stethoscope, small electrocardiogram (ECG) monitor, an otoscope with a sterile ear tip, a pacemaker reader, fall detection tools, in-home sensor readers, ultrasound blood flow detection equipment, a body weight scale, a tape measure, and a smart biometric sensory device capable of detecting different body functions. In one embodiment, one or more of the biometric measuring devices are capable of detecting and transmitting to a data collection computer. The data collection computer may be equipped either in the drone or in the healthcare provider/clinic's computer. Various specimen collection and testing tools may be part of the interchangeable care delivery specific tools. Non-limiting examples of specimen collection devices include nose swabs, saliva tubes, test strips, sugar level glucose (diabetic) monitors, alcohol detectors and alcohol breathalyzers. Non-limiting examples of lab testing tools include a covid-19 self-testing kit, a glucometer with test strips, drainage collection tubes, sputum, stool, and urine collection containers. The medical devices may be barcoded to aid in tracking and billing. In some embodiments, the kit may contain medicines, antibiotic injectable devices, patches, epinephrine injectors, sugar tablets and blood clotting devices. In another embodiment, first aid implements are part of the kit content choices. In one embodiment, the kit also contains general medical devices such as a tongue depressor or pen light.

In one embodiment, the health kit contains various sensor laden health measurement tools that incorporate artificial intelligence (AI), data analytics, real time data, and hand sanitizing. In another embodiment, the kit and/or drone includes retractable measuring devices for wounds, edema, and other circumference measurements. In one embodiment, the kit and/or drone includes attachable cords or other peripherals for adaptive health metric equipment augmentations. The kit may also contain fold away a reversible vision examination lens to examine eyes and detect pupil dilation.

In another embodiment, the kit and any lab testing tools are reloaded through a contract with a 24-hour a day/seven days a week, health-related facility. In one embodiment, the storage system for the kit items includes a locked, code activated dispensing system. A non-limiting example of such a system is an Omnicell/Pyxis automated medication and medical supplies computerized storage cabinet.

In one embodiment, testing kits are dispensed by a Certified Accredited Laboratory with adherence to the Clinical Laboratory Improvement Amendments (CLIA) seven days a week. In another embodiment, the drone waits for a dispatch signal from a health care provider. A signal activates the drone for immediate departure to recipient's location.

In one embodiment, lab testing is done by a lab that has been certified and accredited in accordance with Clinical Laboratory Improvement Amendment (CLIA) federal regulations. In addition, supplies and technology contained in the Drone Health Kit, are maintained in accordance with manufacturing requirements and health care infection control policies.

In one embodiment, the health kit or drone incorporates a verification mechanism to ensure that the correct individual is being helped. In another embodiment, the health kit or drone contains an electronic strip reader for billing purposes and a scanner for transmitting to a secured "cloud" location the credit card, health care insurance and other care delivery identification information. Artificial intelligence can be utilized in the data collection. In another embodiment, the reader has a small wand inside the box that can read implantable health chips.

The health kit will be securely locked onto the drone for flight. At the usage point, the health kit will easily be removed for use by either the patient or another person at point of care. In one embodiment, the health kit outer box is waterproof and safe for sterile equipment and testing devices transport.

Operational Methods

Figure 5:
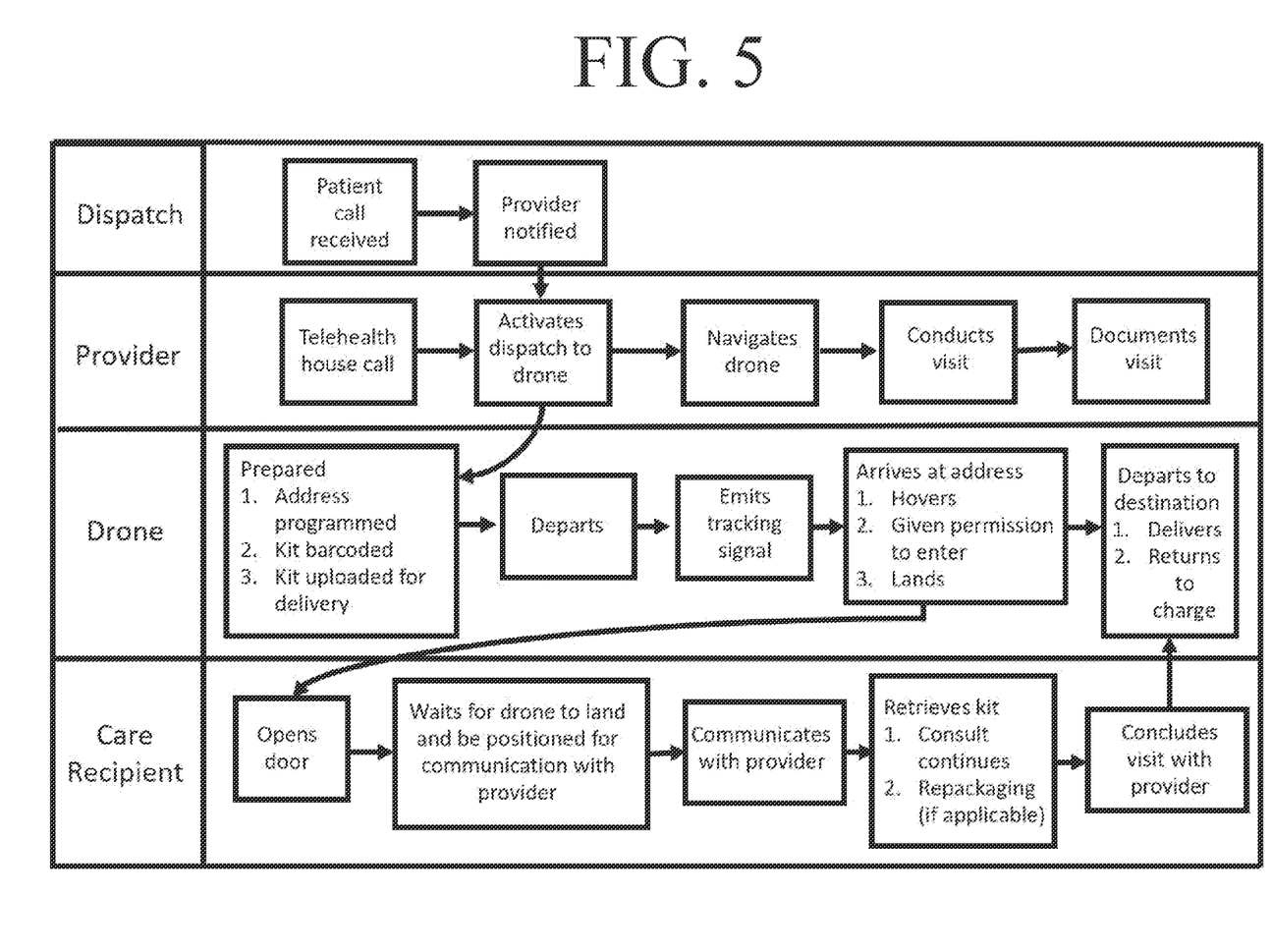
FIG. 5 is an illustration showing an overview of a drone delivery and telehealth process during the interaction between health care provider and care-recipient.

From an operational and functional standpoint, the remote healthcare delivery drone can have many embodiments. A non-limiting example of a method of operating the drone apparatus of the present invention is shown in FIG. 5. In one embodiment, the operational method involves the steps of:
  a. sending the drone/health kit apparatus to a remote location;
  b. establishing communication between a subject and the health care provider via the one or more communication devices;
  c. detaching the health kit from the drone device;
  d. having the subject interact with at least one medical device from the health kit;
  e. reattaching the health kit to the drone device; and
  f. sending the remote health care apparatus to another location.

In another embodiment, the drone sits on a drone docking/charging station located at the drone dispatch home base or at a satellite location. This is a covered area to protect the drone from the elements. The drone has the capability to fly in either fully autonomous or remotely piloted mode. The remotely piloted mode is aided by semi-autonomous capabilities to enhance robust flight operations. In one embodiment, the drone can fly into residential settings. In other embodiments, it is modified to go into other facilities or locations such as: schools, medical facilities, commercial/government buildings, mines, oil rig stations, public transportation, accident scenes, natural disaster, public health calamity, terrorism and/or war zones.

In an embodiment, the drone of the present invention would use the following operational procedures, starting with an initiating call and ending with a return to docking, recharging and dispensing at a filling station. The order of these steps could vary, depending on the circumstances.
  1. Phone triage dispatching center takes the call from a "potential care-recipient or authorized caregiver."
  2. The triage call center notifies a health care provider on call (if protocol algorithm recommends a call from health care provider to caller).
  3. The licensed health care provider (e.g., APRN, Physician, PA, PT, RD, etc.) calls the care-recipient and decides if a Telehealth house call is warranted.
  4. The communication between the health care provider and care-recipient, and the drone is facilitated via a telehealth app, which may be installed on a mobile device. If a house call is needed, the health care provider activates a dispatch notice to the drone.
  5. The drone leaves the docking station loaded with the kit and the address programmed into the drone by the health care provider or pilot.
  6. The drone emits a tracking signal to the ground control station monitored by remote pilot/health care provider via cellular LTE connection. The system can notify health care provider and/or care-recipient of its movements.
  7. Once the drone arrives, the care-recipient or authorized individual allows the drone to enter the residence. If the care-recipient is physically, cognitively or sensory impaired and can't open the door, arrangements are made for another approved person to be involved.
  8. For the compliance, safety and HIPAA adherence, all children and pets will be required to vacate the room in which the drone enters.
  9. In the event that the care-recipient is sick and unable to get to the door, the drone calls an authorized individual (e.g., spouse, neighbor, significant other, family member). The health care provider has the ability to call 911 to request EMS service, if needed. The emergency, for example, could include heart attack, stroke, suicide attempt, or the care-recipient has fallen and needs medical attention for an open wound, head injury, etc. Rules will need to be established about the care-recipient agreeing to permit others to hear exam, responses, etc.

10. Inside the destination location, the health care provider begins interacting, communicating, talking, directing care assistance, and examining while charting on an ancillary computer.
11. The drone's operations inside the care-recipient location are completely controlled remotely by the health care provider/pilot.
12. The care-recipient points to an appropriate place where the drone can land to allow the care-recipient to interact with the health-kit and allow the health care provider to communicate with the recipient via the drone telehealth system.
13. The health care provider engages the care-recipient's help with offloading the kit.
14. Completed lab testing may be delivered, by the drone, to a 24-hour health-related facility and trained individuals will reload the health kit. Health kit items are stored in a locked, code released security system like an Omnicell/Pyxis automated medication and medical supplies dispensing system. Drone health kits should be maintained in a Certified Accredited Laboratory with adherence to the Clinical Laboratory Improvement Amendments (CLIA) (e.g., hospital, pharmacy vending location—Military or Alaska Health care type, pharmacy store, sterile conditions, proper storage of tools).
15. Once the health care provider engages with the care-recipient then the health care provider may need assistance from the care recipient, or other designated individual, to help retrieve items from the health kit.
16. In case the drone loses communication with the health care provider/pilot, it will initiate a lost-link procedure in which it will wait for a prespecified amount of time for communication to resume. If communication does not resume, it would land at an appropriate landing spot.
17. The drone has a capability to be tracked in case it is stolen.
18. At the conclusion of the care visit, the care-recipient would place the health kit back to its original location on the drone.
19. At the end of the operation, the drone will return to its docking station.
20. The health care provider concludes the visit once the drone has delivered the specimen, the health-kit is repacked, the drone is docked, and the charting is completed on an ancillary computer.

In one embodiment, the drone is placed in a docking station after it returns from the remote location. In one embodiment, the docking station recharges the remote health care apparatus. In another embodiment, the method further includes the step of sanitizing the remote health care apparatus after it returns from the remote location. In one embodiment, the method further includes the step of replacing the health kit with another health kit after the remote health care apparatus returns from the remote location. This operation can be completed manually or using automated devices.

Emerging Technology Augmentations

The present invention is capable of leveraging emerging technology that can interface with the drone and telehealth application for end users such as patients and practitioners in areas such as medicine and public health. For example, the innovation may offer an interactive immersive experience that involves interfacing with 3-dimensional representation, virtual humans, and/or holograms. This would be in addition to the 2-dimension illusion of depth. The 3D capability may enable the user to be immersed in tailored real-life scenarios broadly viewed as extended reality and more specifically, including for example, virtual reality, mixed reality, x reality, and augmented reality. The integration of the application with the emerging technology will play a role in: increased compliance, guided recovery and treatment, for training purposes, emergency preparedness, sharing information, better assessments, adherence, evoking cognitive state, patient observation, gamification, rehabilitation, prescreening, surveillance, monitoring, increased engagement, behavior change, prevention, disease management, reducing isolation and loneliness, pain and case management, and post-discharge follow up. This technology may also be used for interaction with operators of the drone. Data generated would be available for data analytics, deep learning, and precision medicine.

The 3D representation may also be presented by a holographic projection technology that integrates with our innovation offering the care-recipient interaction with objects and characters as holograms. With this integration for example, the health care provider could visit a patient anywhere in the world. Holographic sensors may also be included to allow for testing of body fluids such as blood, saliva, consequently allowing for monitoring of disease. This technology can be used by a variety of service providers:

Public Health Practitioners can use holograms in the context of remote public health education involving personal hygiene, collaboration, and detection of microbes such as viruses, for example. The education my involve hand washing, wearing protective equipment, and emergency preparedness.

Nutritionists/Registered dietitian nutritionists (RDNs) provide nutrition education/counseling using hologram of which nutritionists/RDNs show examples of foods for portion control (make them look like sitting next to the patient/client), selecting at a grocery store (reading label in a grocery store), and preparing foods (washing, cutting, cooking, etc. in the kitchen).

Physical therapists use hologram to give directions of prescribed home exercise (e.g., for rehab patients). Patients can watch the 3-D image of the exercise done by the physical therapist and patients can do home exercise with the hologram (as the physical therapist does the exercise with them like next to them). Patient can watch the exercise front, back, and side. Using the AI function of observing the patient's exercise of the drone, feedback can be provided if the patient is doing the exercise correctly.

Speech-Language pathologists (SLPs) can use hologram to provide speech language therapies (e.g., rehab patients). The hologram can be used to show the larynx structure (speech sound structures) and the speech therapist looks sitting the next or in front of the patients and provide directions and provide feedback based on the visual and audio input of the patient.

All documents cited are incorporated herein by reference; the citation of any document is not to be construed as an admission that it is prior art with respect to the present invention.

It is to be further understood that where descriptions of various embodiments use the term "comprising," and/or "including" those skilled in the art would understand that in some specific instances, an embodiment can be alternatively described using language "consisting essentially of" or "consisting of."

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

What is claimed is:

1. A remote health care apparatus comprising:
   a. a drone device comprising one or more communication devices, wherein the drone device is capable of two-way auditory and visual communication, and further, wherein the drone device has a top, a bottom and at least four sides, wherein the drone device comprises ultrasound proximity sensors on four sides of the drone device, at least one ultrasound proximity sensor at the bottom of the drone device; and one or more optical flow sensors at the bottom of the drone device; and
   b. a health kit that is capable of being transported by the drone device;
   wherein the health kit can be detached from the drone device and the health kit contains one or more medical devices selected from the group consisting of biometric measuring devices, specimen collection devices and lab testing tools, and wherein the drone device comprises a collision avoidance system and an obstacle detection system that uses the ultrasound proximity sensors and optical flow sensors.

2. The apparatus of claim 1 wherein the drone device comprises a zooming camera system with high power resolution.

3. The apparatus of claim 1 wherein the drone device comprises an infrared vision camera.

4. The apparatus of claim 1 wherein the drone device comprises ancillary lights for augmenting various locations.

5. The apparatus of claim 1 wherein the drone device is capable of interfacing with blue tooth systems.

6. The apparatus of claim 1 wherein the drone device is capable of interfacing with cloud computing systems.

7. The apparatus of claim 1 wherein the drone device comprises a processor that is capable of artificial intelligent interpretations.

8. The apparatus of claim 7 wherein the processor comprises one or more control algorithms that estimate time delays in communication and accordingly control the speed of the drone device.

9. The apparatus of claim 1 wherein the drone device comprises a navigation system.

10. The apparatus of claim 1 wherein the drone device comprises a cyber security encryption system.

11. The apparatus of claim 1 wherein the drone device comprises anti-theft features.

12. The apparatus of claim 1 wherein the drone device comprises a tracking system.

13. The apparatus of claim 1 wherein the drone device has self-destruction capability.

14. The apparatus of claim 1 wherein at least one biometric measuring device is selected from the group consisting of a pulse oximeter, a thermometer, a blood pressure reader, a pulse reader, a heart rhythm detector, a stethoscope and a tape measure.

15. The apparatus of claim 1 wherein the health kit is lockable.

16. The apparatus of claim 1 wherein the health kit is waterproof.

17. A method of providing health care to a subject that is at a remote location from a health care provider comprising:
   a. sending the remote health care apparatus of claim 1 to the remote location;
   b. establishing communication between the subject and the health care provider via the one or more communication devices;
   c. detaching the health kit from the drone device;
   d. having the subject interact with at least one medical device from the health kit;
   e. reattaching the health kit to the drone device; and
   f. sending the remote health care apparatus to another location.

18. The method of claim 17 further comprising the step of placing the remote health care apparatus in a docking station after it returns from the remote location.

19. The method of claim 18 wherein the docking station recharges the remote health care apparatus.

20. The method of claim 17 further comprising the step of sanitizing the remote health care apparatus after it returns from the remote location.

21. The method of claim 17 further comprising the step of replacing the health kit with another health kit after the remote health care apparatus returns from the remote location.

* * * * *